(12) United States Patent
Ito

(10) Patent No.: US 8,998,330 B2
(45) Date of Patent: Apr. 7, 2015

(54) RECLINING DEVICE

(75) Inventor: Koji Ito, Fujisawa (JP)

(73) Assignee: Shiroki Corporation, Fujisawa-Shi, Kanagawa (JP)

( * ) Notice: Subject to any disclaimer, the term of this patent is extended or adjusted under 35 U.S.C. 154(b) by 0 days.

(21) Appl. No.: 14/006,300

(22) PCT Filed: Feb. 6, 2012

(86) PCT No.: PCT/JP2012/052616
§ 371 (c)(1),
(2), (4) Date: Sep. 19, 2013

(87) PCT Pub. No.: WO2012/132552
PCT Pub. Date: Oct. 4, 2012

(65) Prior Publication Data
US 2014/0001808 A1    Jan. 2, 2014

(30) Foreign Application Priority Data
Mar. 28, 2011   (JP) .................................. 2011-069622

(51) Int. Cl.
*B60N 2/235*    (2006.01)
(52) U.S. Cl.
CPC .................................... *B60N 2/2356* (2013.01)
(58) Field of Classification Search
USPC ................................ 297/367 R, 367 P, 367 L
See application file for complete search history.

(56) References Cited

U.S. PATENT DOCUMENTS

| 6,676,217 | B2 * | 1/2004 | Lange .......................... 297/367 R |
| 6,715,835 | B2 * | 4/2004 | Hoshihara et al. ............. 297/366 |
| 6,910,738 | B2 * | 6/2005 | Bonk ............................. 297/367 R |
| 7,100,986 | B2 * | 9/2006 | Uramichi et al. .............. 297/366 |
| 7,360,838 | B2 * | 4/2008 | Smuk ........................... 297/367 R |
| 7,677,666 | B2 * | 3/2010 | Grable ........................... 297/366 |
| 8,042,872 | B2 * | 10/2011 | Kim et al. ..................... 297/367 L |
| 8,459,743 | B2 * | 6/2013 | Villarroel ..................... 297/367 P |
| 8,602,498 | B2 * | 12/2013 | Yamada et al. ............. 297/367 L |
| 2005/0168034 | A1 * | 8/2005 | Fast ................................ 297/367 |

FOREIGN PATENT DOCUMENTS

| JP | H08-019442 A | 1/1996 |
| JP | 2008-272152 A | 11/2008 |
| JP | 2009-285246 A | 12/2009 |

OTHER PUBLICATIONS

International Search Report (ISR) (PCT Form PCT/ISA/210), in PCT/JP2012/052616, dated Apr. 3, 2012.

* cited by examiner

*Primary Examiner* — Peter Brown
(74) *Attorney, Agent, or Firm* — McGinn IP Law Group, PLLC

(57) ABSTRACT

[Problem] The present invention addresses the problem of providing a reclining device in which a pawl moves smoothly, does not slip and locks well.

[Solution] A cam part that moves a pawl (33) in the direction of a locked position is configured from a rotating cam (first cam) (31) that pushes the pawl (33) in the direction of the locked position and a cam (second cam) (34) that is pressed by the rotating cam (31) and pushes the pawl (33) in the direction of the locked position while pressing same against a guide (25c). The cam part is configured so that when the pawl (33) located at the unlocked position moves to the locked position, the cam part initially presses the pawl (33) with the rotating cam (31), and when the pawl (33) is at the locked position, presses the pawl (33) with the cam (34).

9 Claims, 9 Drawing Sheets

FIG.9   -PRIOR ART-
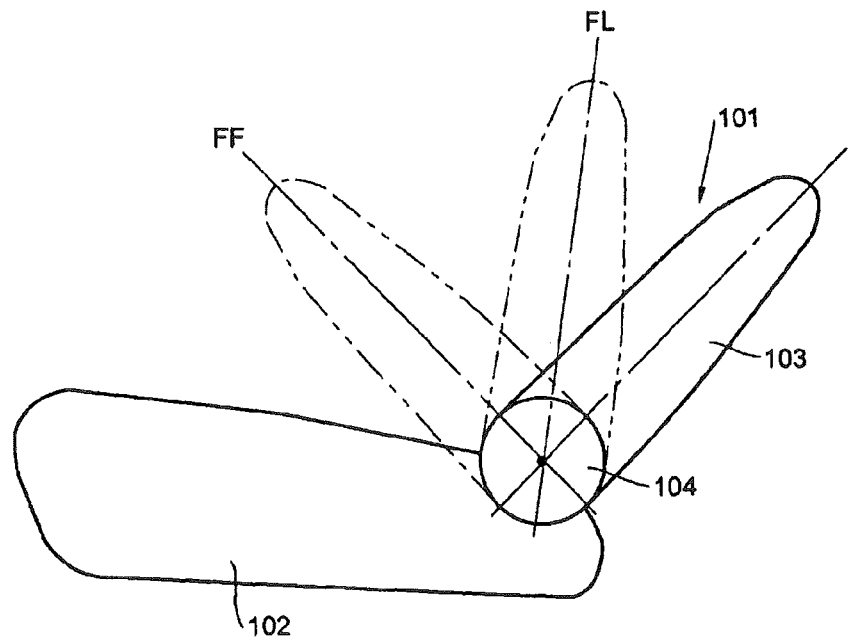
FIG.10   -PRIOR ART-
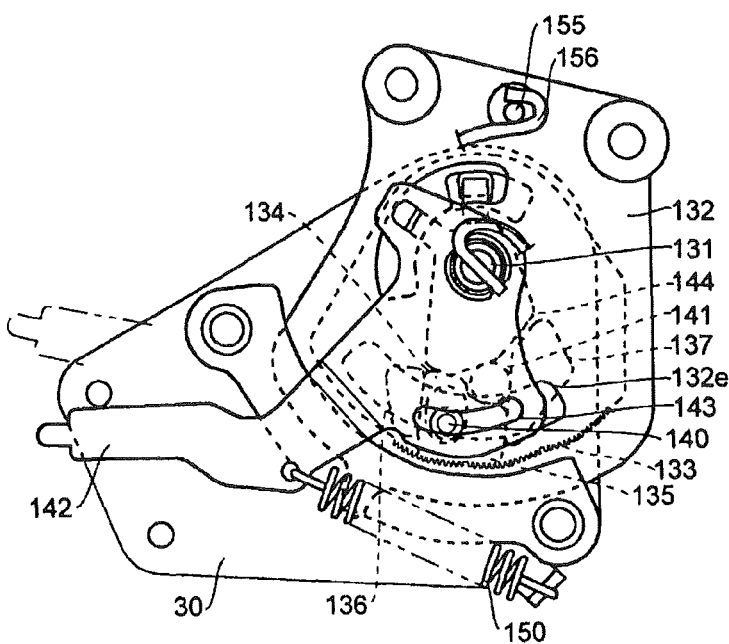

RECLINING DEVICE

TECHNICAL FIELD

The present invention relates to a reclining device that allows and restricts tilting of a seat back of a seat with respect to a seat cushion.

BACKGROUND ART

It will be described with reference to FIG. 9 and FIG. 10. FIG. 9 is a configuration view of a seat, and FIG. 10 is a side view of a reclining device of the seat for a vehicle of the prior art.

As shown in FIG. 9, a seat 101 includes a seat cushion 102 supporting buttocks of a seated person, and a seat back 103 provided to be tiltable with respect to the seat cushion 102 in a forward and rearward direction and to support a back of the seated person. Reference numeral 104 is a reclining device provided on a rotational axis of the tilting of the seat back 103 to allow and restrict the tilting of the seat back 103.

The reclining device 104 will be described with reference to FIG. 10. In the drawing, a hinge pin 131 is provided to stand on a lower arm plate (second member) 130, which is attached to a rear portion of a lower arm provided at a seat cushion side. A ratchet plate (first member) 132 is rotatably arranged on the hinge pin 131 and is fixed to an upper arm provided at a seat-back side. A lower portion of the latchet plate 132 is provided with internal teeth 133 in a circumferential direction of a circle centered on the hinge pin 131.

A pawl 134 is arranged between the lower arm plate 130 and the latchet 132, and it is formed with external teeth 135 which can be engaged with the internal teeth 133 of the latchet plate 132.

The lower arm plat 130 is provided with guides 136 and 137 for guiding the pawl 134 in a radial direction of a circle centered on the hinge pin 131.

A release arm 142 rotatably installed in the hinge pin 131 is formed with a elongate hole 143, into which a pin 140 of the pawl 134 penetrating an arc-shaped elongate hole 132e which is formed in the latchet plate 132 and centered on the hinge pin 131 is fitted. The elongate hole 143 is configured to have a portion close to the internal teeth 133 of the latchet plate 132, and a portion spaced apart from the internal teeth 133, and when the release arm 142 rotates, the pawl 134 moves in the radial direction of the circle centered on the hinge pin 131, and then the external teeth 135 of the pawl 134 is engaged with or disengaged from the internal teeth 133 of the latchet plate 132.

A first cam 144 is rotatably attached to the hinge pin 131.

A second cam 141 is provided between the first cam 144 and an inclined face of the pawl 134, which is opposite to its side formed with the external teeth 135. The inclined face of the pawl 134 is a face intersecting with the radial direction of the circle.

The release arm 142 is applied with an urging force by a spring 150 in such a direction that the first cam 144 presses the pawl 134 via the second cam 141, and the spring 150 has one end portion locked to the release arm 142 and the other end portion locked to the lower arm plate 130.

An end face of the hinge pin 131 is formed with a groove, and an inner end portion of a spiral spring 156, of which an outer end portion is locked to the pin 155 provided to stand on the latchet plate 132, locked to the groove, so that the latchet plate 132 (upper arm) is urged in a forward tilting direction.

Next, the operation of the configuration will be described. The state shown in FIG. 10 is a state where the first cam 144 presses the pawl 134 via the second cam 141 which contacts the inclined face of the first cam 144, the guide 137, and the pawl 134, respectively, and the external teeth 135 of the pawl 134 are engaged with the internal teeth 133 of the latchet plate 132 to restrict the rotation of the latchet plate 132, so that the reclining (tilting) of the seat back is locked and.

In this state, when the release arm 142 located at a position indicated by a solid line is rotated to a position indicated by a two-dot chain line against the urging force of the spring 150, the first cam 144 engaged with the release arm 142 is rotated in the same direction, and thus the state of pressing the pawl via the second cam 141 of the first cam 144 is released.

The pawl 134 having the pin 140 which is fitted into the elongate hole 143 of the release arm 142 is also guided by the guides 136 and 137 to move in the direction of the hinge pin 131, and thus the engaging state of the external teeth 135 of the pawl 134 and the internal teeth 133 of the latchet plate 132 is released, so that the latchet plate 132, i.e. the seat back, is to be in a tiltable state.

When the seated person achieves a desired tilting angle by tilting the desired seat back, one releases the operation force of the release arm 142. Then, the release arm 142 is returned from the position indicated by the two-dot chain line to the position indicated by the solid line by the urging force of the spring 150, and the first cam 144 is rotated in a direction contrary to the above-described direction to be returned in the state in FIG. 10 (e.g., see Patent Document 1).

CITATION LIST

Patent Literature

Patent Document 1: JP-B-H08-019442

SUMMARY

Technical Problem

However, according to the reclining device having the above-described configuration, as the second cam 141 presses the inclined face of the pawl 134, the pawl 134 is always pressed against the guide 136. Accordingly, although there is an effect that rattling between the pawl 134 and the guide 136 when locking is eliminated, and the decrease in locking strength due to the tilting of the pawl 134 is suppressed, when the pawl 134 located at the unlocked position moves to the locked position, there is a problem in that the pawl 134 does not smoothly move.

Additionally, since the pawl 134 does not smoothly move, there is another problem causing a phenomenon that the external teeth 135 cannot be engaged with the internal teeth 133 (hereinafter referred to as tooth jumping) is caused.

The present invention has been made in view of the above-described problems, and an object of the present invention is to provide a reclining device, in which a pawl moves smoothly, the tooth jumping does not occur, and thus a locking operation is favorably performed.

Solution to Problem

In order achieve at least one of the above objects, a reclining apparatus according to one aspect of the present invention including: a first member, which is provided with internal teeth along a circumferential direction thereof; a second member, which is stacked on the first member and is provided to be rotatable relative to the first member in the circumferential direction; a pawl, which is movably provided on the second member and is provided with external teeth formed to engage with the internal teeth; a guide, which is formed in the second member to guide the pawl between a locked position in which the internal teeth are engaged with the external teeth and an unlocked position in which the internal teeth are not engaged with the external teeth; and a cam part provided between the first member and the second member to move the pawl in a position of the locked position, wherein the cam part is configured by: a first cam rotatably provided on an axis of the relative rotation and pressing the pawl in the direction of the locked position; and a second cam provided between the first cam and the pawl and pressed by the first cam to press the pawl in the direction of the locked position while pressing the pawl against the guide, wherein, when the pawl located at the unlocked position moves to the locked position, the cam part initially presses the pawl with the first cam and then presses the pawl with the second cam in a state where the pawl is at the locked position.

In the reclining device, it is preferable that when the pawl located at the unlocked position moves to the locked position, the cam part initially presses the pawl only with the first cam, then presses the pawl with the first cam and the second cam between the unlocked position and the locked position, and thus presses the pawl only with the second cam in the state where the pawl is at the locked position.

Additionally, it is preferable that when the external teeth and the internal teeth start to engage with each other, the cam part presses the pawl with the second cam.

Herein, the phrase "the external teeth and the internal teeth start to engage with each other" means that an addendum circle of the external teeth starts to lap an addendum circle of the internal teeth.

Additionally, it is preferable that a gap is formed between the first cam and the pawl in the state where the pawl is located at the locked position and is capable of contacting contacts the first cam when the pawl is tilted.

Effect of the Invention

According to the present invention, the cam part includes the first cam rotatably provided on an axis of the relative rotation and pressing the pawl in the direction of the locked position, and the second cam provided between the first cam and the pawl and pressed by the first cam to press the pawl in the direction of the locked position while pressing the pawl against the guide. When the pawl located at the unlocked position moves to the locked position, the cam part initially presses the pawl with the rotating cam. Therefore, when the pawl located at the unlocked position moves to the locked position, frictional resistance is small, and thus the pawl moves smoothly, so that the tooth jumping does not occur, and the locking operation is favorably performed.

Further, since the pawl is pressed with the cam in the state where the pawl is at the locked position, the rattling between the pawl and the guide is eliminated, and the decrease in locking strength due to the tilting of the pawl is prevented.

Other effects of the present invention will be more apparent from the following detailed description of the invention and the accompanying drawings.

BRIEF DESCRIPTION OF DRAWINGS

FIG. 9 is a configuration view of a seat.

FIG. 10 is a side view of a reclining device of the seat for a vehicle of the prior art.

DESCRIPTION OF EMBODIMENTS

Figure 1:
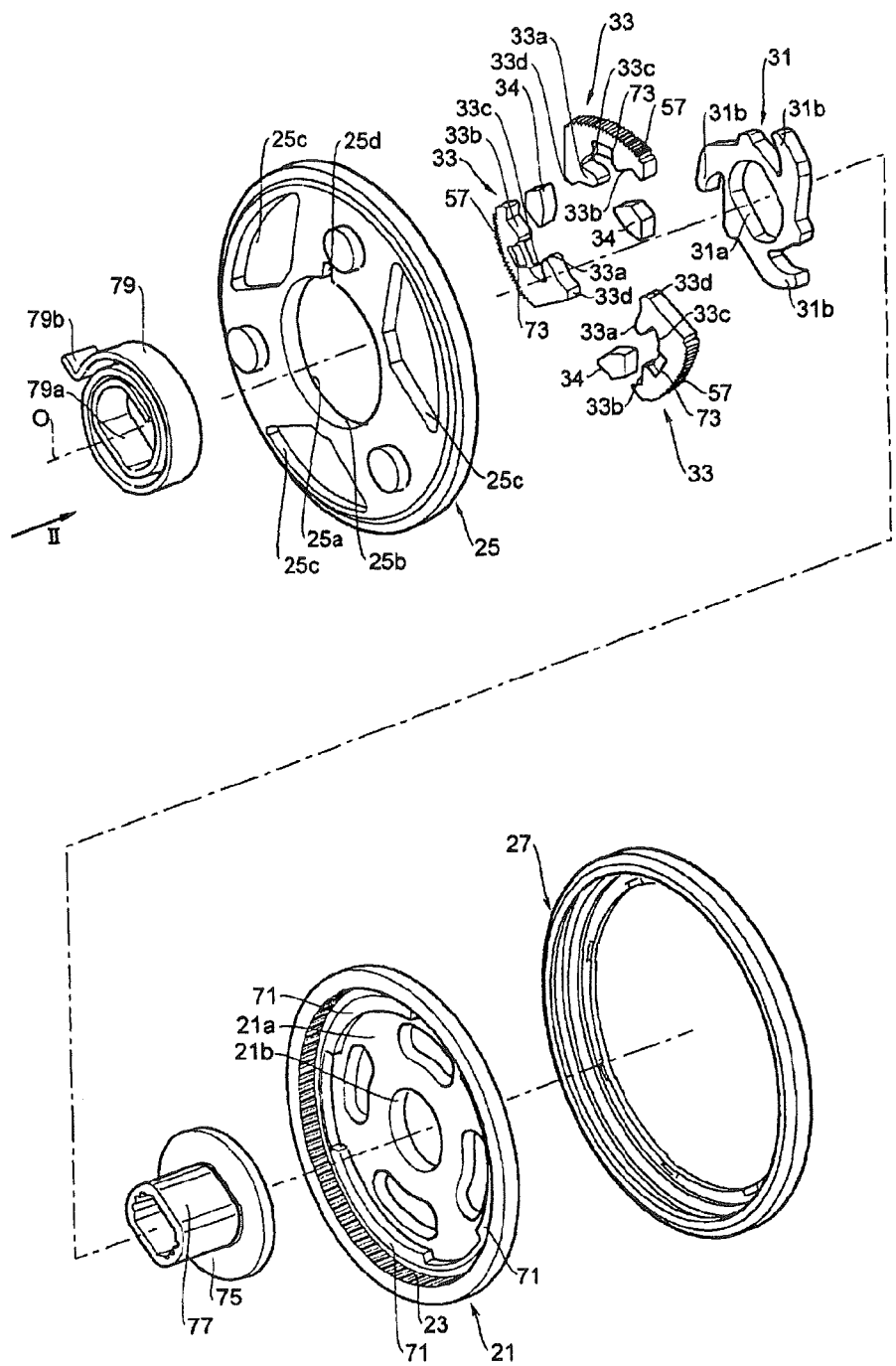
FIG. 1 is an exploded perspective view showing a reclining device of the present embodiment.
Figure 2:
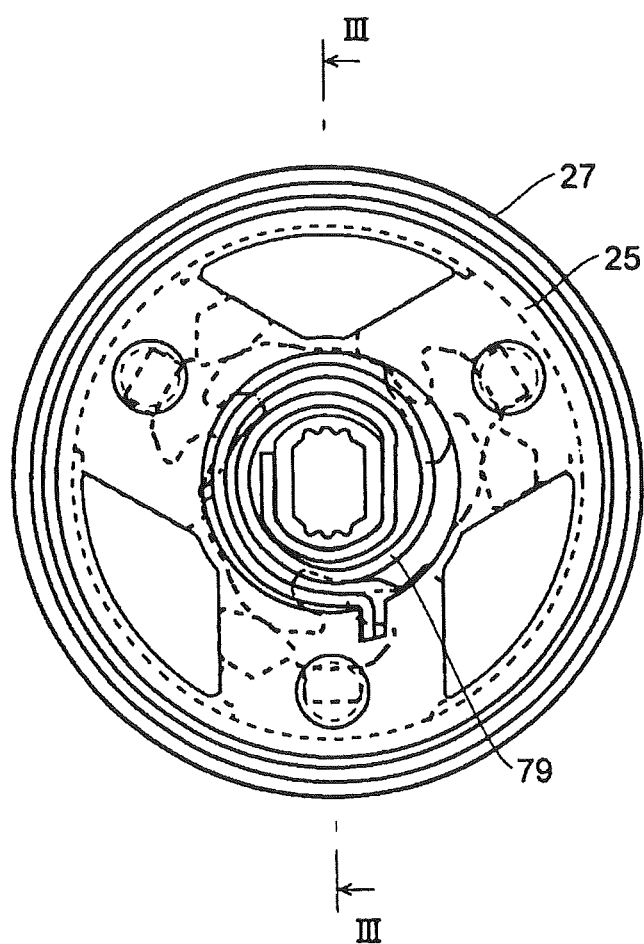
FIG. 2 is a perspective view showing a ratchet in FIG. 1 as viewed from an arrow II.
Figure 3:
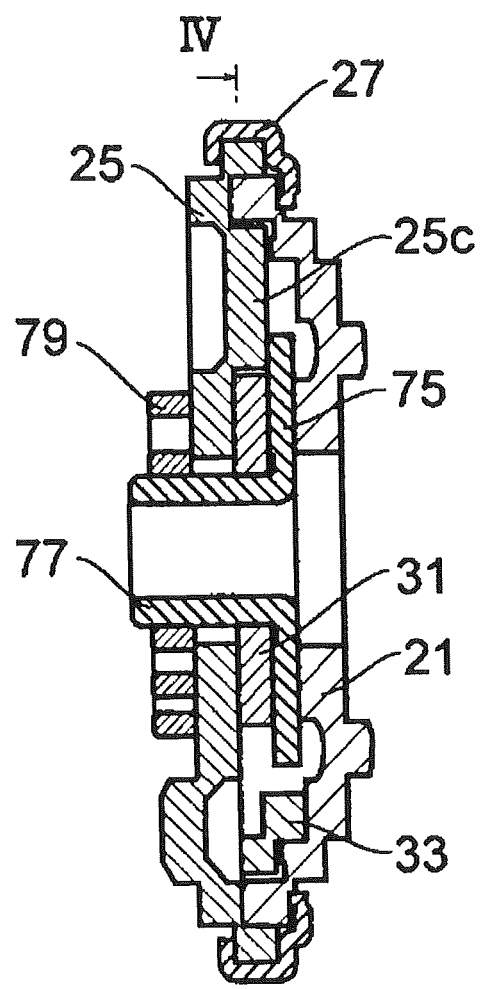
FIG. 3 is a cross-sectional view taken along the section line in FIG. 2.
Figure 4:
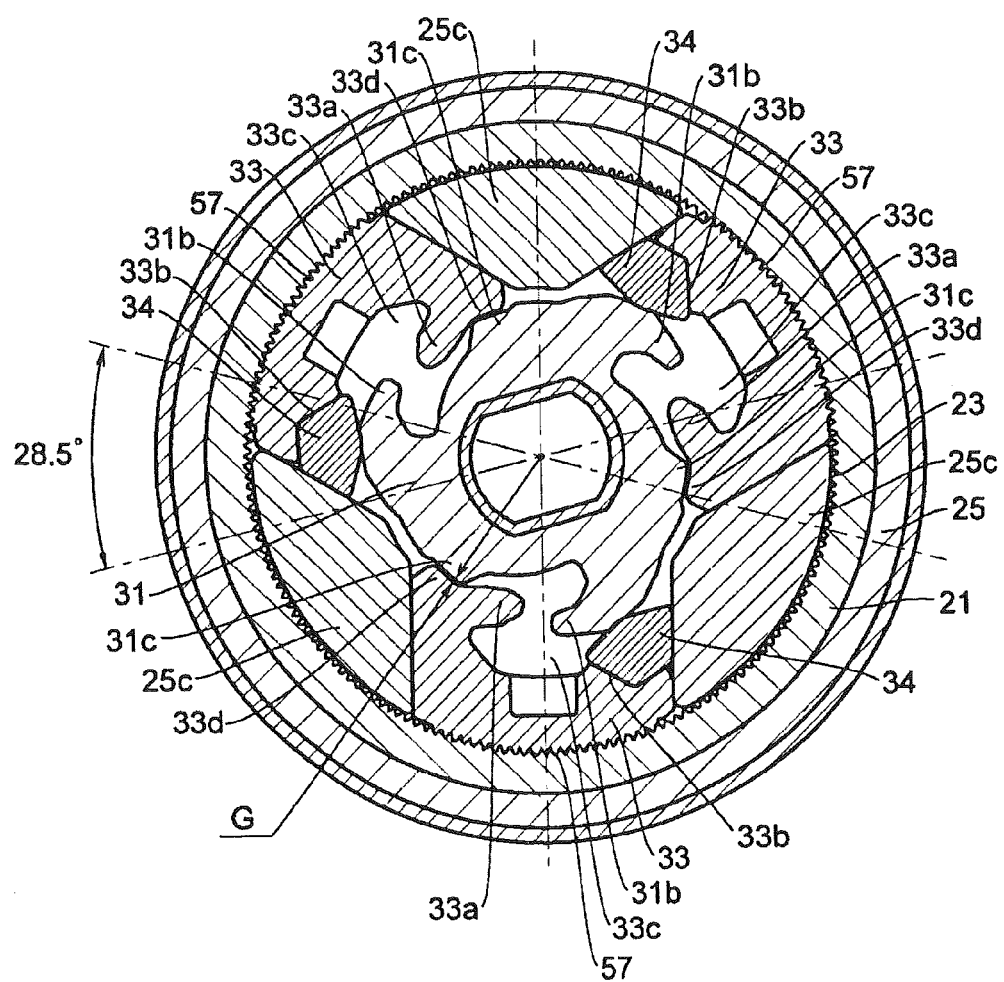
FIG. 4 is a cross-sectional view taken along the section line IV-IV in FIG. 3 to explain a state where pawls are at a locked position (state where a rotating cam is rotated by 28.5 degrees in a full open state).
Figure 5:
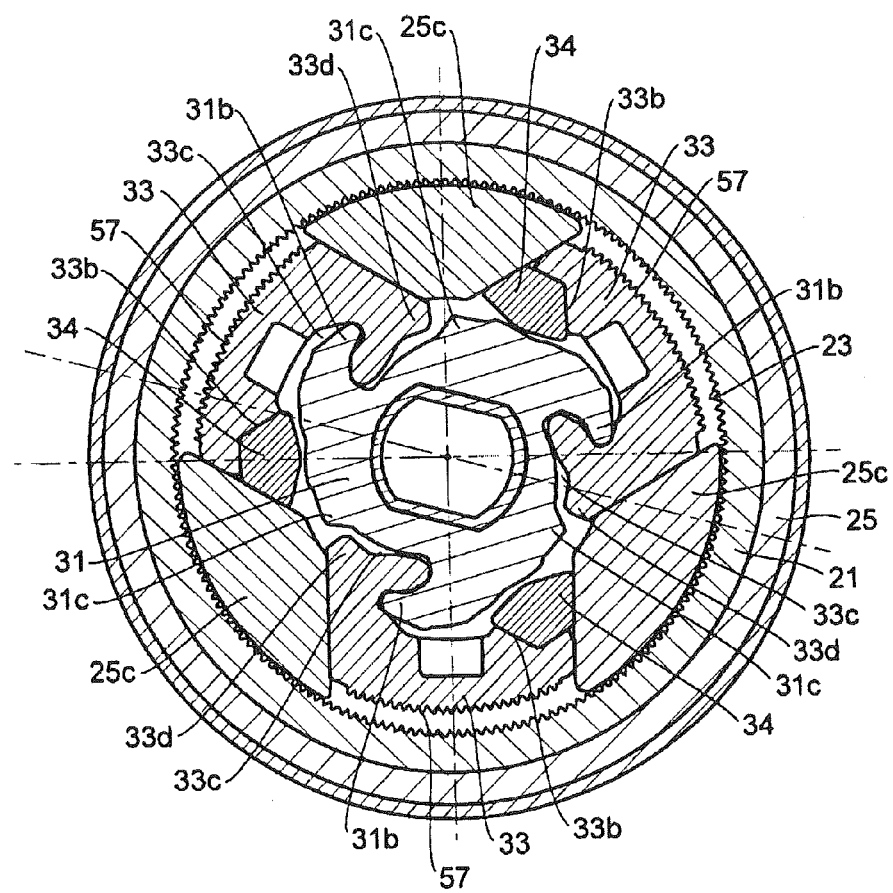
FIG. 5 is a view explaining the full open state in FIG. 4 (state where the pawls are at an unlocked position).
Figure 6:
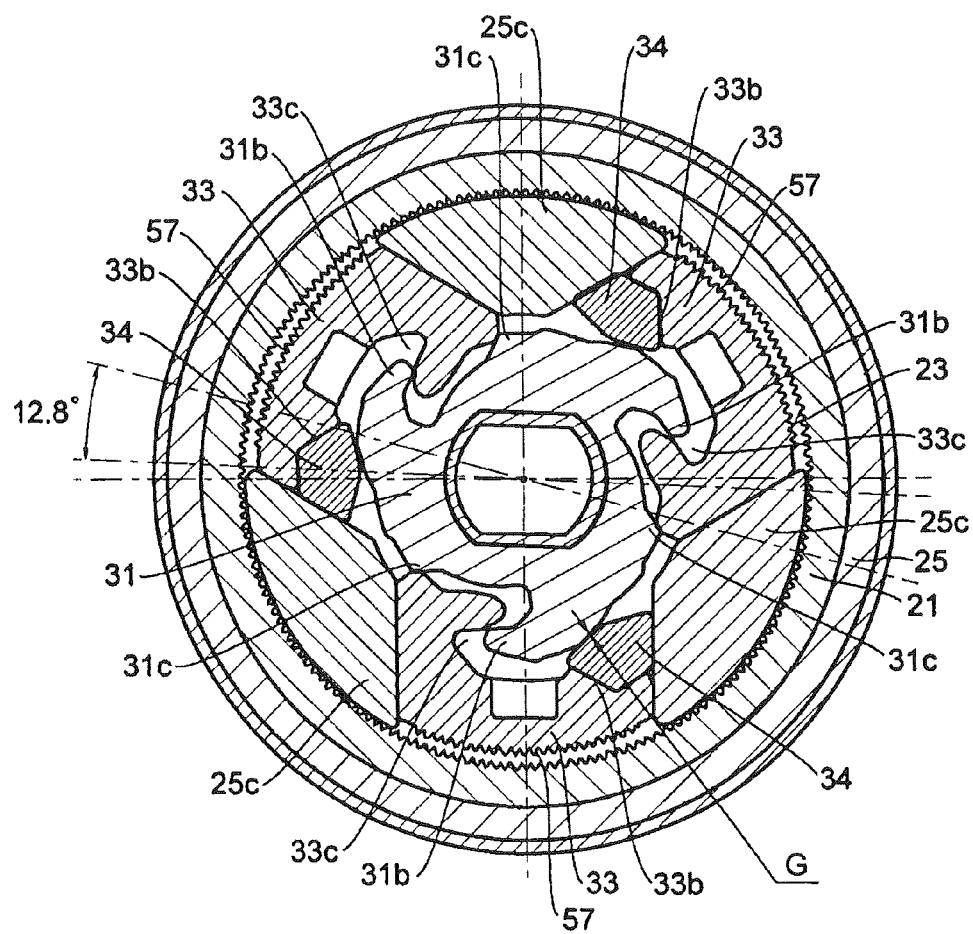
FIG. 6 is a view explaining the state where the rotating cam is rotated by 12.8 degrees from the full open state in FIG. 5.
Figure 7:
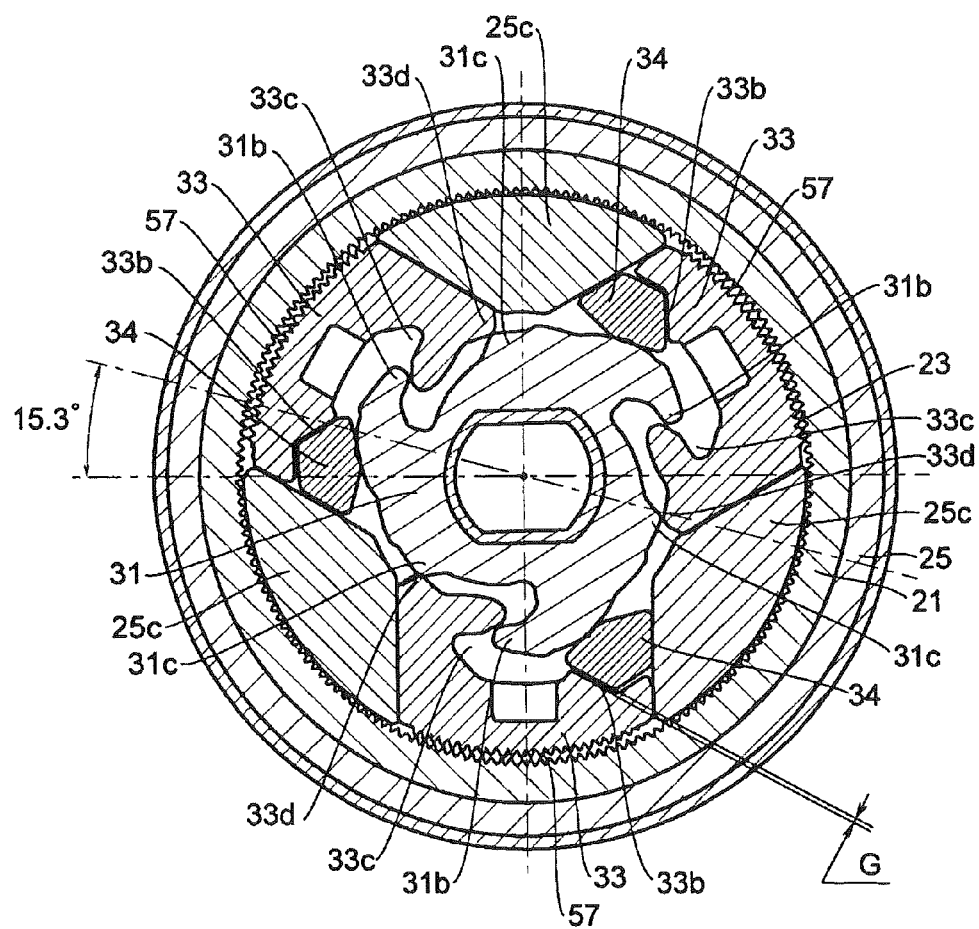
FIG. 7 is a view explaining the state where the rotating cam is rotated by 15.3 degrees from the full open state in FIG. 5.
Figure 8:
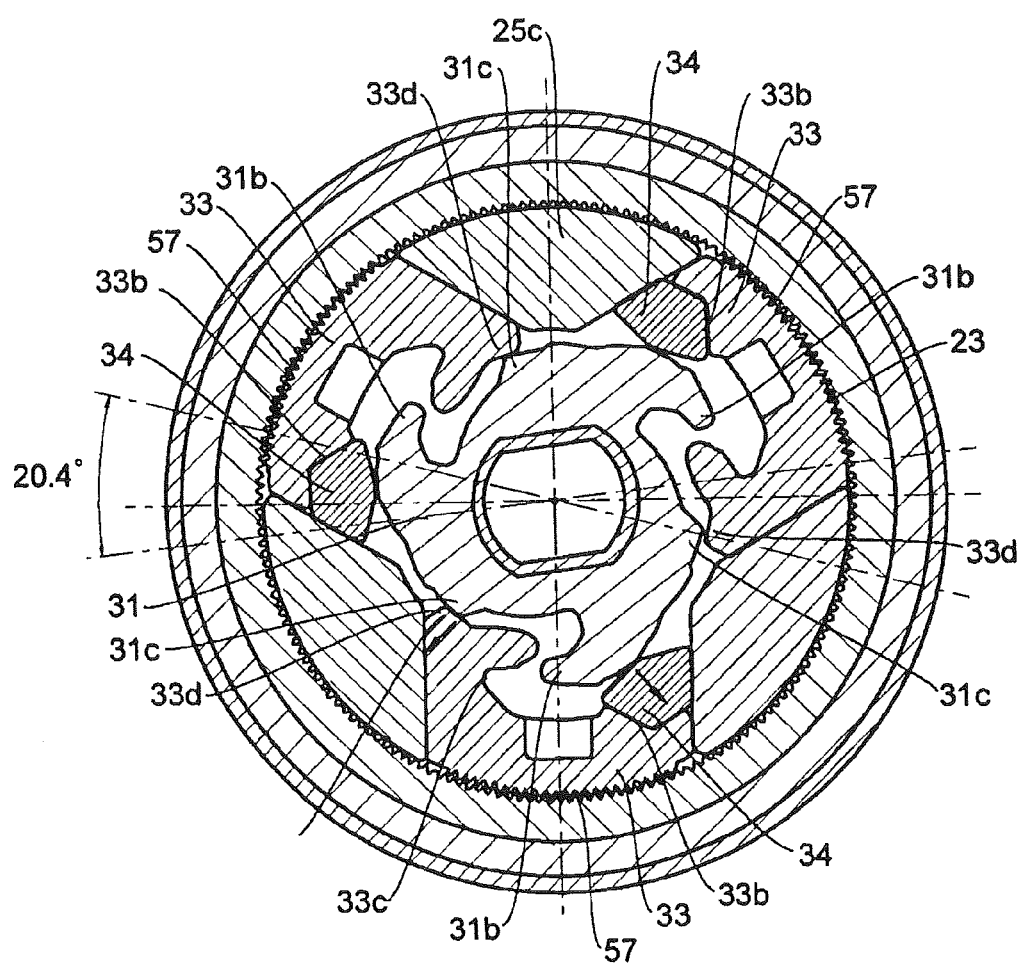
FIG. 8 is a view explaining the state where the rotating cam is rotated by 20.4 degrees from the full open state in FIG. 5.

Next, an embodiment of the present invention will be described to the accompanying drawings. FIG. 1 is an exploded perspective view illustrating a reclining device of the present embodiment. FIG. 2 is a perspective view illustrating a ratchet in FIG. 1 as viewed from an arrow II. FIG. 3 is a cross-sectional view taken along the section line III-III in FIG. 2. FIG. 4 is a cross-sectional view taken along the section line IV-IV in FIG. 3 to illustrate a state where a pawls are at a locked position (state where a rotating cam is rotated by 28.5 degrees in a full open state). FIG. 5 is a view explaining the full open state in FIG. 4 (state where the pawls are at an unlocked position). FIG. 6 is a view explaining the state where the rotating cam is rotated by 12.8 degrees from the full open state in FIG. 5. FIG. 7 is a view explaining the state where the rotating cam is rotated by 15.3 degrees from the full open state in FIG. 5. FIG. 8 is a view explaining the state where the rotating cam is rotated by 20.4 degrees from the full open state in FIG. 5.

First, the configuration of the reclining device according to the present embodiment will now be described with reference to FIGS. 1 to 4.

The reclining device according to the present embodiment is provided on a rotational axis of the tilting of the seat back 103, similarly to the reclining device 104 in FIG. 9.

In FIG. 1, a ratchet (first member) 21 provided on a side of the seat back is obtained by half-blanking a disk-shaped plate material using a press working and has a bottomed cylindrical shape, in which one face is opened. Internal teeth 23 are formed on an inner cylindrical face of the ratchet 21 along the circumferential direction overall. A through-hole 21b is formed in the center of a bottom portion 21a.

A base plate (second member) 25 provided on a side of a seat cushion is also obtained by half-blanking on a disk-shaped plate material by a press working and has a bottomed cylindrical shape, one side of which is an open side. A diameter of a bottom portion 25a of the bottomed cylinder is set to be slightly larger than an outer diameter of the ratchet 21. Also, the ratchet 21 is fitted into the bottom portion 25a, and the base plate 25 and the ratchet 21 are able to relatively rotate. Also, a through-hole 25b is formed in the center of the base plate 25.

Further, as shown in FIG. 3, an outer circumferential portion of the ratchet 21 and an outer circumferential portion of the base plate 25 are clamped by an outer circumferential ring 27 having a ring shape, so that the ratchet 21 and the base plate 25 are held to be able to relatively rotate, without being separated in a direction of a relative rotation axis (a reference numeral O in FIG. 1).

Returning to FIG. 1, a rotating cam 31 (fist cam) is disposed in a space defined by the bottom portion 21a of the ratchet 21 and the bottom portion 25a of the base plate 25. A non-circular (oval-track) through-hole 31a is formed in the center of the rotating cam 31.

Three pawls 33 are arranged on the base plate 25 to be located outside the rotating cam 31. The pawls 33 have external teeth 57 to be able to engage with the internal teeth 23.

Then, as shown in FIG. 4, the base plate 35 is provided with guides 25c for guiding the respective pawls 33 in a radial direction of the relative rotation. Therefore, each pawl 10 is movable in the radial direction of the relative rotation.

Also, a cam (second cam) 34 is disposed among each pawl 33, the rotating cam 31 and each guide 25c.

Returning to FIG. 1, a recess 33c extending in a direction intersecting with the radial direction of the relative rotation, and a hook portion 33a are formed on a face opposite to a face, on which the external tooth 57 is formed, of each pawl 33.

Meanwhile, three hook portions 31b to be entered into the recess 33c of each pawl 33 are formed on a circumferential portion of the rotating cam 31. Also, a lock face 33b, to which each cam 34 can be contacted, is formed on the face opposite to the face, on which the external tooth 57 is formed, of each pawl 33. The lock face 33b intersects with the radial direction of the relative rotation, and it is set as a face generating a force causing the pawl 33 to be pressed against the guide 25c and a force causing the pawl 33 to move in an engaging direction (radial direction of the relative rotation) of the external teeth 57 and the internal teeth 23, when it is pressed by the cam 34.

Additionally, the hook portion 33a of each pawl 33 is formed with a rotating cam contacting portion 33d which can contact a cam contacting portion 31c formed on the rotating cam 31 at a portion except for the hook portion 31b.

Also, as shown in FIG. 4, when the rotating cam 31 is rotated in one direction (a counter-clockwise direction in the figure), the hook portions 31b of the rotating cam 31 press the cams 34, and the cams 34 press the guides 25c and the lock faces 33b of the pawls 33, so that the pawls 33 are moved in a direction away from the relative rotation axis to be positioned at a locked position, where the external teeth 57 of the pawls 33 are engaged with the internal teeth 23 of the ratchet 21.

In this instance, a gap G (0.2 mm in the present embodiment) is formed between the cam contacting portions 31c of the rotating cam 31 and the rotating cam contacting portions 33d of the pawls 33.

According to the present embodiment, an unlock holding mechanism configured by three arc-shaped guides 71, which is formed along a circumferential direction of an inner cylindrical face of the ratchet 21 and is located at a side of the bottom portion 21a than the internal teeth 23, and protrusions 73, which is respectively formed on a face of each pawl 33 opposite to the bottom portion 21a of the ratchet 21 by half-blanking, is provided.

Then, when the protruding portions 73 of the respective pawls 33 contact the arc-shaped guides 71, the pawls 33 are hold at the unlocked position in which the external teeth 57 are unengaged with the internal teeth 23 of the latchet 21.

An operation shaft 77, which has a non-circular (oval-track) sectional shape and rotate integrally with the rotating cam 31, is engaged in the non-circular through-hole 31a of the rotating cam 31. A flange portion 75, which formed on an outer circumferential face of the operation shaft 77 along the circumferential direction overall, protrudes in the radial direction of the operation shaft 77 and contacts to the bottom portion 21a of the ratchet 21, to restrict the operation shaft 77 from being tilted in any direction with respect to the bottom portion 21a of the ratchet (first member) 21. The flange portion 75 according to the present embodiment is configured as one continuous flange which is formed over the circumferential direction of the outer circumferential face of the operation shaft 77. However, the flange portion 75 may be configured as a plurality of non-continuous flanges. In this case, to restrict the operation shaft 77 from being tilted in any direction with respect to the bottom portion 21a of the ratchet (first member) 21, it is sufficient that an angle in the circumferential direction of a gap between the adjacent flanges be less than 180 degrees.

Further, the operation shaft 77 is set to have a height exposed from the through-hole 25b of the base plate 25 to the outside.

Additionally, a spiral spring 79 formed by working on an elongated spring plate material in a spiral shape is disposed in the through-hole 25b of the base plate 25. An inner end 79a of the spiral spring 79 is locked on the operation shaft 77 and an outer end is locked in a notch 25d, which is formed in a circumferential face of the through-hole 25b of the base plate 25. Due to an urging force of the spiral spring 79, the pawls 33 are urged in a direction toward the locked position via the rotating cam 31.

Here, the operation of the reclining device according to the present embodiment will be described with reference to FIGS. 4 to 8.

As shown in FIG. 4, when an operation force is not exerted on the rotating cam 31, the rotating cam 31 is rotated in one direction (counterclockwise direction) by the urging force of the spiral spring 79, and thus the hook portions 31b of the rotating cam 31 are pressed against the lock faces 33b of the pawls 33 via the cam 34. As described above, when the lock faces 33b of the pawls 33 are pressed, a force causing the pawls 33 to move in the engaging direction (radial direction of the relative rotation) of the external teeth 57 and the internal teeth 23 is generated, so that the pawls 33 are at the locked position in which the external teeth 57 of the pawls 33 are engaged with the internal teeth 23 of the ratchet 21. Therefore, the relative rotation between the ratchet 21 and the base plate 25 is restricted, and thus the seat back is to be in the state where it cannot rotate with respect to the seat cushion (the lock state). Further, a force causing the pawls 33 to be pressed against the guides 25c is also generated, so that the rattling between the pawls 33 and the guides 25c is eliminated.

When the rotating cam 31 (operating shaft 77) is rotated in other direction (clockwise direction in the drawing) against the urging force of the spiral spring 79 from the state where the pawls 33 are at the locked position, the hook portions 31b of the rotating cam 31 enter the concave portions 33c of the pawls 33, they are engaged with the hook portions 33a of the pawls 33, (they are pressed against the inner wall of the concave portions 33c at the rotational center side of the relative rotation thereof), and then the pawls 33 are pulled in the direction close to the axis of the relative rotation, and thus the pawls 33 are at the unlocked position (full open state), shown in FIG. 5, in which the engaging state of the external teeth 57 and the internal teeth 23 of the latchet 21 is released. Accordingly, the relative rotation between the latchet 21 and the base plate 25 is possible, so that the seat back is to be rotatable with respect to the seat cushion.

When the operation force is released from the rotating cam 31 in the full open state shown in FIG. 5, the rotating cam 31 is rotated in the counterclockwise direction by the urging force of the spiral spring 79.

When the rotating cam 31 is rotated by 12.8 degrees in the counterclockwise direction, as shown in FIG. 6, the cam contacting portions 31c of the rotating cam 31 contact the rotating cam contacting portions 33d of the pawls 33 to press the pawls 33 in the lock direction. When the cam contacting portions 31c contact the rotating cam contacting portions 33d, the rotating cam contacting portions 33d of the pawls 33 are configured to generate little force causing the pawls 33 to be pressed against the guides 25c, and they generate only force causing the pawls 33 to move in the engaging direction (radial direction of the relative rotation) of the external teeth 57 and the internal teeth 23.

Next, when the rotating cam 31 is rotated by 15.3 degrees, as shown in FIG. 7, the cam contacting portions 31c of the rotating cam 31 contact the rotating cam contacting portions 33d of the pawls 33 to press the pawls 33 in the lock direction. Simultaneously, the hook portions 31b of the rotating cam 31 start to press the cams 34, and thus the cams 34 start to move in the direction of the lock faces 33b of the pawls 33. At that time, the cams 34 do not contact the lock faces 33b of the pawls 33.

Additionally, when the rotating cam 31 is rotated by 20.4 degrees, as shown in FIG. 8, the cam contacting portions 31c of the rotating cam 31 contact the rotating cam contacting portions 33d of the pawls 33 to press the pawls 33 in the lock direction. Simultaneously, the hook portions 31b of the rotating cam 31 start to press the lock faces 33b of the pawls 33 via the cams 34. That is, the rotating cam 31 and the cams 34 configures the cam part for pressing the pawls 33 to move the pawls 33 in the direction of the locked position. In the present embodiment, when the rotating cam 31 is rotated more than 20.4 degrees, an addendum circle of the external teeth 57 starts to lap an addendum circle of the internal teeth 23. That is, the external teeth 57 and the internal teeth 23 start to engage with each other.

When the rotating cam 31 is rotated more than 20.4 degrees, the cam contacting portions 31c of the rotating cam 31 start to separate from the rotating cam contacting portions 33d of the pawls 33, but the hook portions 31b of the rotating cam 31 start to press the lock faces 33b of the pawls 33 via the cams 34. When the rotating cam 31 is rotated by 28.5 degrees, the pawls 33 are pressed to the locked position shown in FIG. 4, so that the external teeth 57 of the pawls 33 and the internal teeth 23 of the latchet 21 are returned to the lock state where they are engaged with each other without rattling.

Between a first lock (FL) state and a forward falling (FF) state shown in FIG. 9, even though the operation force of the operating shaft 77 is released by the above-described unlock holding mechanism, the pawls 33 are hold at the unlocked position, so that the seat back is to be rotatable, without operating the operating shaft 77. That is, between the first lock (FL) state and the forward falling (FF) state shown in FIG. 9, the protruding portion 73 of each pawl 33 is positioned on the arc-shaped guide 71, the pawls 33 are hold at the unlocked position, even though the operation force is released from the operating shaft 77. Therefore, the relative rotation between the latchet 21 and the base plate 25 is to be possible.

In this configuration of the reclining device as described above, the following effects are achieved.

(1) When the pawls 33 located at the unlocked position move to the locked position, the cam part initially presses the pawls 33 with the rotating cam 31. Therefore, when the pawls 33 located at the unlocked position move to the locked position, frictional resistance is to be small, and thus the pawls move smoothly, the tooth jumping does not occur, and thus the locking operation is favorably performed.

Further, since the pawls 33 are pressed with the cam 34 in the state where the pawls 33 are at the locked position, the rattling between the pawls 33 and the guides 25c is eliminated, and the decrease in locking strength due to the tilting of the pawls 33 is prevented.

(2) When the pawls 33 located at the unlocked position move to the locked position, the cam part initially presses the pawls 33 only with the rotating cam 31, then presses the pawls 33 with the rotating cam 31 and the cam between the unlocked position and the locked position, and thus the cam part presses the pawls only with the cam 34 in the state where the pawls 33 are at the locked position, so that the pawls 33 are always pressed with the rotating cam 31 or the cam 34, so that the pawls 33 move reliably.

Further, as compared with the cam pressing the pawls 33 is instantaneously switched from the rotating cam 31 to the cam 34, since the mechanism in which the pawls 33 are pressed by the rotating cam 31 and the cam 34 between the unlocked position and the locked position, it is possible to largely set an allowable error in precision of parts of the rotating cam 31, the cam 34, and the pawls 33.

(3) When the external teeth 57 and the internal teeth 23 start to engage with each other, the pawls 33 are pressed with the cam 34, and thus it is possible to further prevent the tooth jumping.

(4) In the state where the pawls 33 are at the locked position, since the gap (0.2 mm in the present embodiment) is provided between the cam contacting portion 31c of the rotating cam 31 and the rotating cam contacting portion 33d of the pawl 33, a large force acts on the reclining device. Therefore, even though the pawls 33 contacting the cam 34 are inclined, the pawls 33 contact the rotating cam 31, and thus the lock state is retained without largely inclining the pawls 33.

The present invention is not limited to the above-described embodiment. In the above-described embodiment, the ratchet 21 is provided on the seat-back side and the base plate 25 is provided on the seat cushion side in the above-described embodiment. In contrast, the base plate 25 may be provided on a side of the seat back, and the ratchet 21 may be provided on the seat cushion.

Additionally, in the case where the pawls are inclined in the state where the pawls 33 are at the locked position, the cam contacting portions 31c of the rotating cam 31 and the rotating cam contacting portions 33d of the pawls 33 contact with each other, thereby preventing the pawls 33 from being largely inclined, in above-described embodiment. However, other portions of the pawls 33 and the rotating cam 31 may be brought into contact.

Further, the present invention can be properly modified or revised without being deviated from the thoughts and the claims of the invention.

REFERENCE NUMERALS LIST

21: Latchet
23: Internal teeth
25: Base plate
31: Rotating cam (first cam)
31b: Hook portion
33: Pawl
33d: Cam contacting portion
33c: Concave portion
34: Cam (second cam)
57: External teeth

The invention claimed is:

1. A reclining apparatus, comprising:
a first member, which is provided with internal teeth along a circumferential direction thereof;
a second member, which is stacked on the first member and is provided to be rotatable relative to the first member in the circumferential direction;
a pawl, which is movably provided on the second member and is provided with external teeth formed to engage with the internal teeth;
a guide, which is formed in the second member to guide the pawl between a locked position in which the internal teeth are engaged with the external teeth and an unlocked position in which the internal teeth are not engaged with the external teeth; and
cam parts provided between the first member and the second member to move the pawl in a position of the locked position,
wherein the cam parts comprise:
a first cam rotatably provided on an axis of a relative rotation and pressing the pawl in a direction of the locked position; and
a second cam provided between the first cam and the pawl and pressed by the first cam to press the pawl in the direction of the locked position while pressing the pawl against the guide,
wherein, when the pawl located at the unlocked position moves to the locked position, the cam parts initially press the pawl with the first cam and then press the pawl with the second cam in a state where the pawl is at the locked position, and
wherein, the cam parts press the pawl only with the second cam in the state where the pawl is at the locked position.

2. The reclining device according to claim 1, wherein, when the pawl located at the unlocked position moves to the locked position, the cam parts initially press the pawl only with the first cam, then press the pawl with the first cam and the second cam between the unlocked position and the locked position, such that the cam parts press the pawl only with the second cam in the state where the pawl is at the locked position.

3. The reclining device according to claim 1, wherein, when the external teeth and the internal teeth start to engage with each other, the cam parts press the pawl with the second cam.

4. The reclining device according to claim 1, wherein a gap is formed between the first cam and the pawl in a state where the pawl is located at the locked position and is capable of contacting the first cam when the pawl is tilted.

5. The reclining device according to claim 1, wherein the pawl is movable in a radial direction of the relative rotation.

6. The reclining device according to claim 5, wherein the pawl comprises:
a recess extending in a direction intersecting with the radial direction of the relative rotation;
a hook portion formed on a face opposite to a face on which the external teeth is formed; and
a lock face to which the second cam is configured to be contacted, the lock face being formed on the face opposite to the face on which the external teeth is formed.

7. The reclining device according to claim 6, wherein the lock face intersects with the radial direction of the relative rotation, and the lock face is set as a face generating a force causing the pawl to be pressed against the guide and a force causing the pawl to move in the radial direction of the relative rotation when the lock face is pressed by the second cam.

8. The reclining device according to claim 6, wherein the first cam comprises:
another hook portion formed on a circumferential portion of the first cam and configured to be entered into the recess of the pawl.

9. The reclining device according to claim 8, wherein the hook portion of the pawl comprises a rotating cam contacting portion which contacts a cam contacting portion formed on the first cam at a portion other than said another hook portion of the first cam.

* * * * *